United States Patent
Abolafia et al.

(10) Patent No.: US 9,977,724 B2
(45) Date of Patent: May 22, 2018

(54) SYSTEMS AND METHODS FOR CORRECTING TIMESTAMPS ON DATA RECEIVED FROM UNTRUSTED DEVICES

(71) Applicant: Google Inc., Mountain View, CA (US)

(72) Inventors: Dan Abolafia, Sunnyvale, CA (US); Igor Naverniouk, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 361 days.

(21) Appl. No.: 14/859,345

(22) Filed: Sep. 20, 2015

(65) Prior Publication Data
US 2017/0083552 A1    Mar. 23, 2017

(51) Int. Cl.
*G06F 17/00* (2006.01)
*G06F 11/34* (2006.01)
*G06F 17/30* (2006.01)
*G06F 17/40* (2006.01)

(52) U.S. Cl.
CPC .... *G06F 11/3476* (2013.01); *G06F 17/30306* (2013.01); *G06F 17/30353* (2013.01); *G06F 17/40* (2013.01); *G06F 2201/835* (2013.01); *G06F 2201/86* (2013.01)

(58) Field of Classification Search
CPC .......... G06F 11/3476; G06F 17/30306; G06F 17/30353
USPC ...................................................... 707/690
See application file for complete search history.

(56) References Cited

U.S. PATENT DOCUMENTS

| | | | | |
|---|---|---|---|---|
| 7,251,748 B2* | 7/2007 | Liberty | ............... | G06F 11/0769 707/999.201 |
| 7,675,406 B2* | 3/2010 | Baier | ..................... | G06Q 50/04 340/506 |
| 8,122,274 B2* | 2/2012 | Hussain | ................... | G06F 1/14 713/400 |
| 8,209,567 B2* | 6/2012 | Cohen | ................. | G06F 11/3476 714/26 |

(Continued)

FOREIGN PATENT DOCUMENTS

WO    2005001647 A2    1/2005

OTHER PUBLICATIONS

Schatz, Bradley, et al., "A correlation method for establishing provenance of timestamps in digital evidence", Digital Investigation, vol. 3, Supplement, Sep. 2006, pp. S98-S107.*

(Continued)

*Primary Examiner* — Robert Stevens
(74) *Attorney, Agent, or Firm* — Colby Nipper (57) ABSTRACT

Aspects of the technology include receiving (202) an event log of events, each that are associated with wall clock and uptime clock timestamps, and extracting (204) a currently analyzed event from the event log. Further, aspects include associating (208) a processor time to the currently analyzed event as a trusted event time if the event is the first event. Aspects include calculating (212) an elapsed time from wall clock times associated with an immediately preceding event and the currently analyzed event where the immediately preceding event is a boot log event. Further aspects can include calculating (214) the elapsed time from uptime clock times associated with the immediately preceding event and the currently analyzed event where the immediately preceding event is not a boot log event. Finally, aspects can include calculating (216) a trusted time by deducting the elapsed time from a trusted event time.

21 Claims, 3 Drawing Sheets

(56) References Cited

U.S. PATENT DOCUMENTS

| | | | | |
|---|---|---|---|---|
| 8,412,946 | B2* | 4/2013 | Savitzky | G06F 21/725 713/176 |
| 8,719,452 | B1* | 5/2014 | Ding | H04N 21/4344 709/248 |
| 2006/0294593 | A1* | 12/2006 | Eldar | G06F 1/14 726/26 |
| 2007/0198706 | A1 | 8/2007 | Mechelli et al. | |
| 2010/0011214 | A1 | 1/2010 | Cha et al. | |
| 2013/0041999 | A1* | 2/2013 | Cowham | G06F 11/302 709/224 |
| 2013/0080818 | A1* | 3/2013 | Kumar | G06F 1/14 713/500 |
| 2014/0095887 | A1* | 4/2014 | Nayshtut | G06F 21/57 713/189 |
| 2015/0172317 | A1* | 6/2015 | Osborne | H04L 63/20 713/178 |

OTHER PUBLICATIONS

Antsilevich, Eugene, "Capturing Timestamp Precision for Digital Forensics", James Madison University Infosec Techreport, Dept. of Computer Science, JMU-INFOSEC-TR-2009-0002, Jan. 2009, 32 pages.*

Buchholz, Florian, et al., "A brief study of time", Digital Investigation, vol. 4, Supplement, Sep. 2007, pp. S31-S42.*

Nakatumba, Joyce, et al., "Analyzing Resource Behavior Using Process Mining", BPM 2009 Workshops, LNBIP 43, Springer-Verlag, Berlin, Germany, © 2010, pp. 69-80.*

* cited by examiner

SYSTEMS AND METHODS FOR CORRECTING TIMESTAMPS ON DATA RECEIVED FROM UNTRUSTED DEVICES

BACKGROUND

Computing devices, such as mobile phones or wearable devices, may allow users to change the time on the device. For example, a computing device may allow a user to alter the device's wall clock (i.e., the clock on the mobile device that displays the time to the user). In general, data relating to how and when a user utilizes a computing device can be valuable information to, for example, mobile application developers and software developers. But because the user can manually adjust the wall clock on his device, devices such as servers that receive communications from the computing device cannot trust the timestamps associated with the received communications (e.g., event logs). Further, wall clock changes are more common than one might expect because many games include time-based rewards that sometimes provoke users to set their device clocks ahead.

Receiving devices often mitigate the issues associated with receiving data from untrusted devices by utilizing their own internal time. For example, when a server receives an event log, the server can use its own time as the correct time and then by using the relative difference between the correct time and the time stamped by the untrusted sending device, the server can assign corrected times to the events in the event log. This mitigation method fails, however, if the mobile device user changes the device's time in between the device transmitting event logs to an external computing device. For example, if a computing device goes an extended period without submitting an event log, and the user changes the wall clock during that period, this conventional mitigation method will be ineffective.

BRIEF DESCRIPTION OF THE FIGS.

Reference will now be made to the accompanying FIGS., which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein.

Example implementations of the disclosed technology can provide systems and methods for correcting time stamps on data received from untrusted devices. For example, some implementations utilize a computing device's wall clock and uptime clock. Accordingly, whenever that computing device logs an event, the device associates both the wall clock time and uptime clock time with the event. Additionally, computing devices can log device resets (i.e., boot log events) and wall clock changes as events, and the computing device can associate the relevant wall clock and uptime clock times with those events. Finally, computing devices can log event log uploads as events and associate the requisite wall and uptime clock times to those upload events.

According to example implementations, a server (i.e., a receiving device) receives an event log from a computing device (i.e., a sending device) and sets about reconciling the times associated with events in the event log to determine a trusted time. The server can iteratively extract an event (i.e., the currently analyzed event) from the event log and make a series of determinations. If the event is the first event in the log (i.e., the event log upload), the server can associate to the event the server's own internal time, which can serve as the trusted baseline time. If the currently analyzed event is immediately preceded in the event log by a boot log event, the server can calculate the elapsed time between the currently analyzed event and the boot log event by taking the difference between the wall clock times associated with the boot log event and the currently analyzed event. If the currently analyzed event is not immediately preceded by a boot log event, the server can calculate the elapsed time between those events using the uptime clock times associated with the immediately preceding event and the currently analyzed event. Thus, as will be appreciated, the disclosed systems and methods provide for the determination of accurate, trusted times associated with events in event logs and are robust to users changing the time on their devices.

Example implementations of the disclosed technology will now be described with reference to the accompanying figures.

Figure 1:
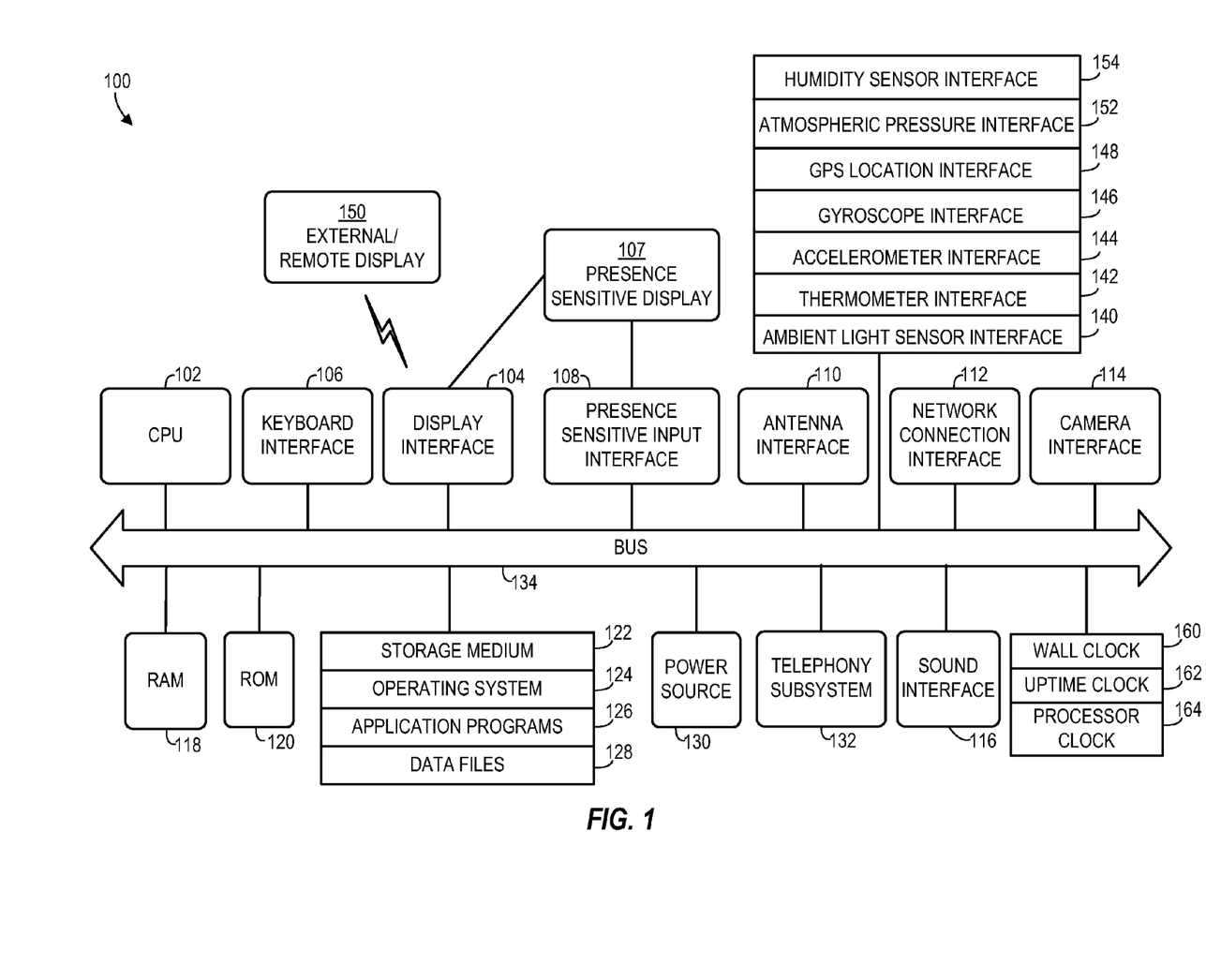
FIG. 1 depicts computing system architecture 100, according to an example implementation of the disclosed technology.

As desired, implementations of the disclosed technology include a computing device with more or fewer of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that supports a graphical user interface and provides functions for rendering video, graphics, images, and texts on the display. In certain example implementations of the disclosed technology, the display interface 104 connects directly to a local display, such as a touch-screen display associated with a mobile computing device. In another example implementation, the display interface 104 is configured for providing data, images, and other information for an external/remote display 150 that is not necessarily physically connected to the mobile computing device. For example, a desktop monitor may be utilized for mirroring graphics and other information that is presented on a mobile computing device. In certain example implementations, the display interface 104 wirelessly communicates, for example, via a Wi-Fi channel or other available network connection interface 112 to the external/remote display.

In an example implementation, the network connection interface 112 is configured as a wired or wireless communication interface and provides functions for rendering video, graphics, images, text, other information, or any combination thereof on the display. In one example, a communication interface includes a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a physical or virtual keyboard. In one example implementation, the computing device architecture 100 includes a presence-sensitive display interface 108 for connecting to a presence-sensitive display 107. According to certain example implementations of the disclosed technology, the presence-sensitive input interface 108 provides a communication interface to various devices such as a pointing device, a capacitive touch screen, a resistive touch screen, a touchpad, a depth camera, etc. which may or may not be integrated with a display.

The computing device architecture 100 may be configured to use one or more input components via one or more of input/output interfaces (for example, the keyboard interface 106, the display interface 104, the presence sensitive input interface 108, network connection interface 112, camera interface 114, sound interface 116, etc.) to allow the computing device architecture 100 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, an input component may be integrated with the computing device architecture 100 or may be a separate device. As additional examples, input components may include an accelerometer, a magnetometer, a digital camera, a microphone, and an optical sensor.

Example implementations of the computing device architecture 100 include an antenna interface 110 that provides a communication interface to an antenna; a network connection interface 112 may support a wireless communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to example implementations, the computing device architecture 100 includes a wall clock 160. In some implementations, a wall clock 160 maintains device time that is visible to a device user, and a wall clock 160 can be adjusted by a user. Further, in some implementations, the computing device architecture 100 includes an uptime clock 162. An uptime clock 162 typically functions to count the time that has elapsed since a computing device was last reset or last powered down and then powered back on, at which point an uptime clock 162 typically resets to zero. As will be understood and appreciated, generally, when a device reboots and the uptime clock resets to zero, a device logs a device boot event at some time later because the device needs to finish rebooting and the logging process needs to be started by the device's operating system. As will be understood by one of skill in the art, an uptime clock 162 and a wall clock 160 can operate independently of each other. Thus, if a user adjusts the time of a wall clock 160, such an adjustment does not necessarily affect an uptime clock 162. Similarly, a device reboot, which can restart an uptime clock 162, does not necessarily affect a wall clock 160. Additionally, in some implementations, the computing device architecture 100 includes a processor clock 164. In some implementations, a processor clock 164 maintains a trusted (e.g., true) time for a computing device. Typically, a user cannot manipulate a processor clock 164, and the processor clock 164 does not restart based on a device reset or when the device is powered off and then powered back on. In some implementations, a processor clock 164 syncs with an external clock (e.g., an atomic clock) at predetermined intervals to maintain true or trusted time.

According to example implementations, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to example implementations, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files include an operating system 124, application programs 126 (including, for example, a web browser application, a widget or gadget engine, and or other applications, as necessary), and data files 128. According to example implementations, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive audio and data information over a telephone network. Although shown as a separate subsystem, the telephony subsystem 132 may be implemented as part of the network connection interface 112. The constituent components and the CPU 102 communicate with each other over a bus 134.

According to an example implementation, the CPU 102 has appropriate structure to be a computer processor. In one arrangement, the CPU 102 includes more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 to execute software programs. Data may be stored in the RAM 118, where the computer CPU 102 can access data during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro- DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may include a machine-readable storage medium.

According to example implementations, the term "computing device," as used herein, may be a CPU, or conceptualized as a CPU (for example, the CPU 102 of FIG. 1). In such example implementations, the computing device (CPU) may be coupled, connected, and/or in communication with one or more peripheral devices, such as display. In other example implementations, the term "computing device," as used herein, may refer to a mobile computing device such as a smartphone, tablet computer, or smart watch. In such implementations, the computing device may output content to its local display and/or speaker(s). In another example implementation, the computing device may output content to an external display device (e.g., over Wi-Fi) such as a TV or an external computing system.

In example implementations of the disclosed technology, a computing device includes any number of hardware and/or software applications that are executed to facilitate any of the operations. In example implementations, one or more I/O interfaces facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
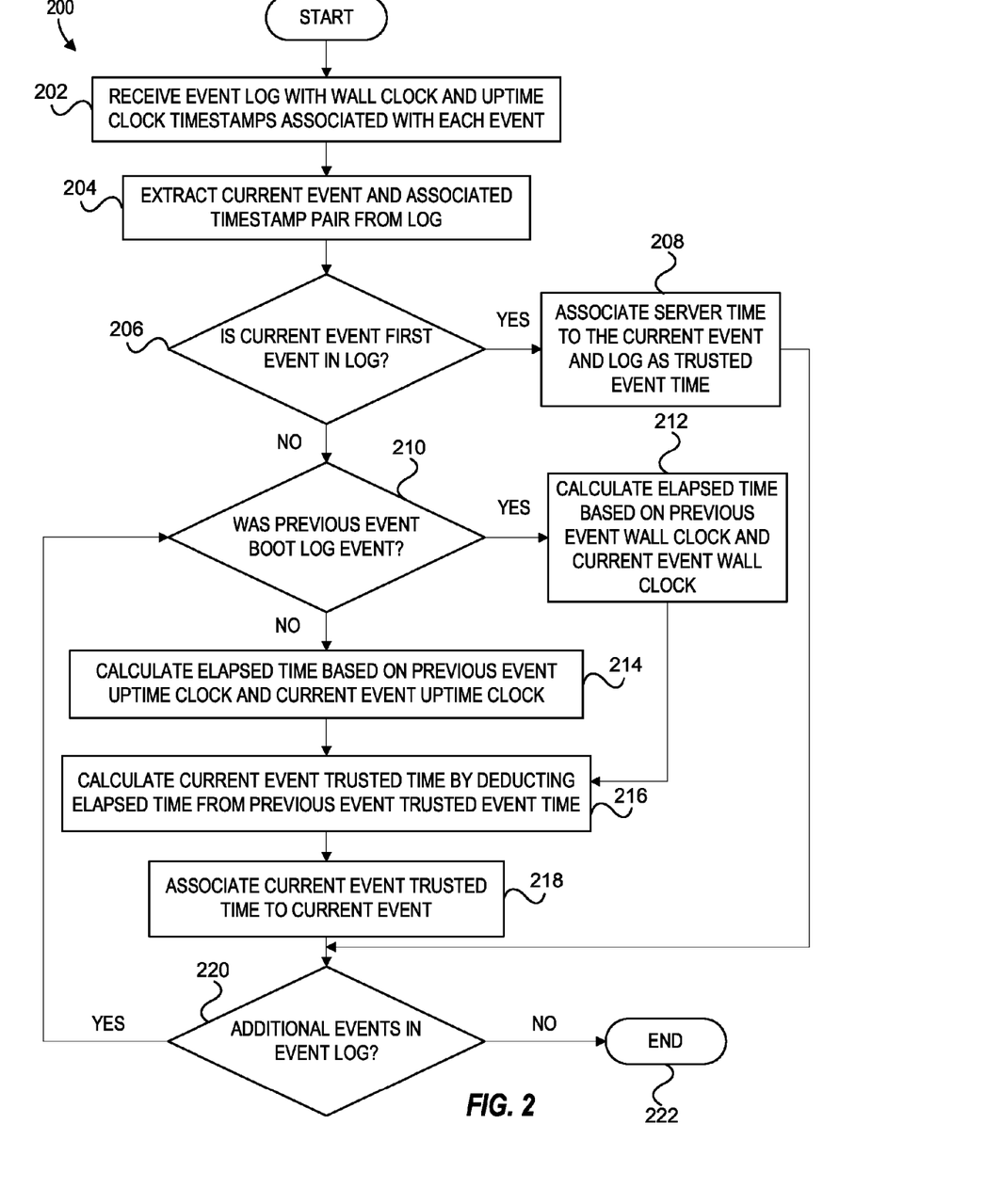
FIG. 2 illustrates a flow diagram of a method 200, according to an example implementation.

FIG. 2 illustrates a flow diagram of a method 200 according to an example implementation of the disclosed technology. The method 200 begins when a computing device receives 202 an event log from, for example, a mobile computing device (i.e., a sending device). In some implementations, the event log includes various events that occurred on the mobile computing device or that were detected by the mobile computing device. For example, the event log can include events for wall clock changes, device reboots, and event log transmissions. Further, events can include, interactions with a user interface (e.g., display interface 104) associated with the mobile computing device. For example and not limitation, a mobile computing device can log an interaction such as "button X was pressed in dialog A" in an event log. Events also can include states of a mobile computing device. For example and not limitation, a computing device can log WiFi signal strength as an event in the event log when a particular application connects to a third-party server. Also, in some implementations, a computing device can log errors as events in an event log (e.g., "null pointer exception caught in activity Z"). Further, according to some implementations, each event in the event log can be associated with a wall clock time and an uptime clock time. For example, in some implementations, the sending device includes a wall clock 160 and an uptime clock 162, as shown in FIG. 1. Accordingly, when the sending device detects an event or an event occurs on the sending device, the sending device can associate two timestamps to the event for storing in the event log: a wall clock timestamp and an uptime clock timestamp. As will be understood by one of skill in the art, in some implementations, a timestamp is an instance of time that is stored in memory (e.g., RAM 118 or ROM 120), which may be an integer in Unix time either in seconds or milliseconds. Additionally, in some implementations, an event log includes events for wall clock changes and device boots, each of which are associated with wall clock and uptime clock timestamps. Put differently, when a user manually changes a wall clock 160 on a computing device (e.g., a sending device), the computing device stores that wall clock change in the event log. Further, when the computing device is powered down and then powered back up, or when the device is restarted, the device stores that device boot in an event log. Finally, in some implementations, the device stores the transmission (i.e., uploading) of the event log as an event in the event log. As will be understood and appreciated, device boots and event log uploads can be stored as events with corresponding wall clock and uptime clock timestamps.

As shown in FIG. 2, in some implementations, the computing device extracts 204 from the received event log a currently analyzed event (i.e., current event). As will be understood and appreciated, in some implementations, the computing device traverses and analyzes the received event log in reverse-chronological order. Thus, for example, the first event that the computing device extracts from the event log (i.e., the currently analyzed event) will be the last event that occurred on the sending device or that was detected by the sending device. In example implementations, the computing device determines 206 whether the extracted currently analyzed event is the first event in the event log (i.e., the event log). In some implementations, if the computing device traverses the event log in reverse-chronological order, the first event in the event log will be the transmission of the event log. Thus, as shown in FIG. 2, if the computing device determines the currently analyzed event is the first event in the event log, the computing device can associate 208 its own server time (e.g., based on processor clock 164) to the currently analyzed event (i.e., the transmission or uploading of the event log) and log that time as a trusted event time. As will be understood and appreciated by one of skill in the art, a delay exists between the time the sending device logs the transmission of the event log is logged as an event and the time the computing device receives the event log. In some implementations, the computing device accounts for this latency when associating 208 its own server time to the currently analyzed event. After associating the server time to the first event in the log and logging that as a trusted time, the computing device can determine 220 whether there are any more events in the event log. As will be understood and appreciated, if there are other events in the event log (i.e., the answer at decision block 220 is "yes"), the currently analyzed event will become the previous event and cease to be the currently analyzed event.

As shown in FIG. 2, if at decision block 206 the computing device determines the currently analyzed event was not the first event in the event log, the computing device can determine 210 whether the event immediately preceding the currently analyzed event was a boot log event (i.e., the first logged event after a device boot). If the event immediately preceding the currently analyzed event (i.e., the "previous event") was a boot log event, the computing device can calculate 212 the time elapsed between the immediately preceding event (i.e., the boot log event) and the currently analyzed event using the wall clock timestamps (e.g., as determined from wall clock 160) associated with the currently analyzed event and the immediately preceding event. Accordingly, the computing device can calculate 216 a trusted time for the currently analyzed event (i.e., a "currently analyzed event trusted time") by deducting the calculated elapsed time (as determined at block 212) from the trusted event time of the preceding event. In example implementations, the computing device can associate 218 the currently analyzed event trusted time to the currently analyzed event. Further, the computing device can determine 220 whether there are more events in the event log.

As shown in FIG. 2, if at decision block 210 the computing device determines the previous event was not a device boot, the computing device can calculate 214 an elapsed time between the currently analyzed event and the previous event based on the uptime clock timestamps (e.g., as determined from uptime clock 162) associated with the currently analyzed event and the previous event. In some implementations, the computing device can calculate 216 a trusted time for the currently analyzed event by deducting the calculated elapsed time (as determined at block 214) from the trusted event time of the preceding event (i.e., the previous event). Further, as shown in FIG. 2, the computing device can associate 218 the currently analyzed event trusted time to the currently analyzed event, and the computing device can determine 220 whether there are more events in the event log. If the computing device determines there are no more events in the event log, the method 200 ends 222.

As will be appreciated, accurate, trusted times associated with events in event logs that are robust to users changing the times on their devices are useful in various applications. For example, mobile application developers and software developers have an interest in event logs with trusted times because it can allow them to make inferences about how a user interacts with a device. For example, a time-corrected event log can tell a software developer how long a user spent viewing various dialog windows, how long it took a user to navigate to a particular aspect or feature of an application, or how long a user spent interacting with a specific feature of an application. As will be understood and appreciated, such information can help a developer understand whether an application is intuitive and user-friendly and provides a good experience, or whether aspects of the application should be redesigned. Further, event log data with corrected timestamps can allow a software developer to calculate how long it took a user to complete an out-of-the-box setup on a new computing device. Also, event log data with corrected timestamps can help a developer determine how long it takes a device to send a request and receive a response from a third-party server.

Figure 3:
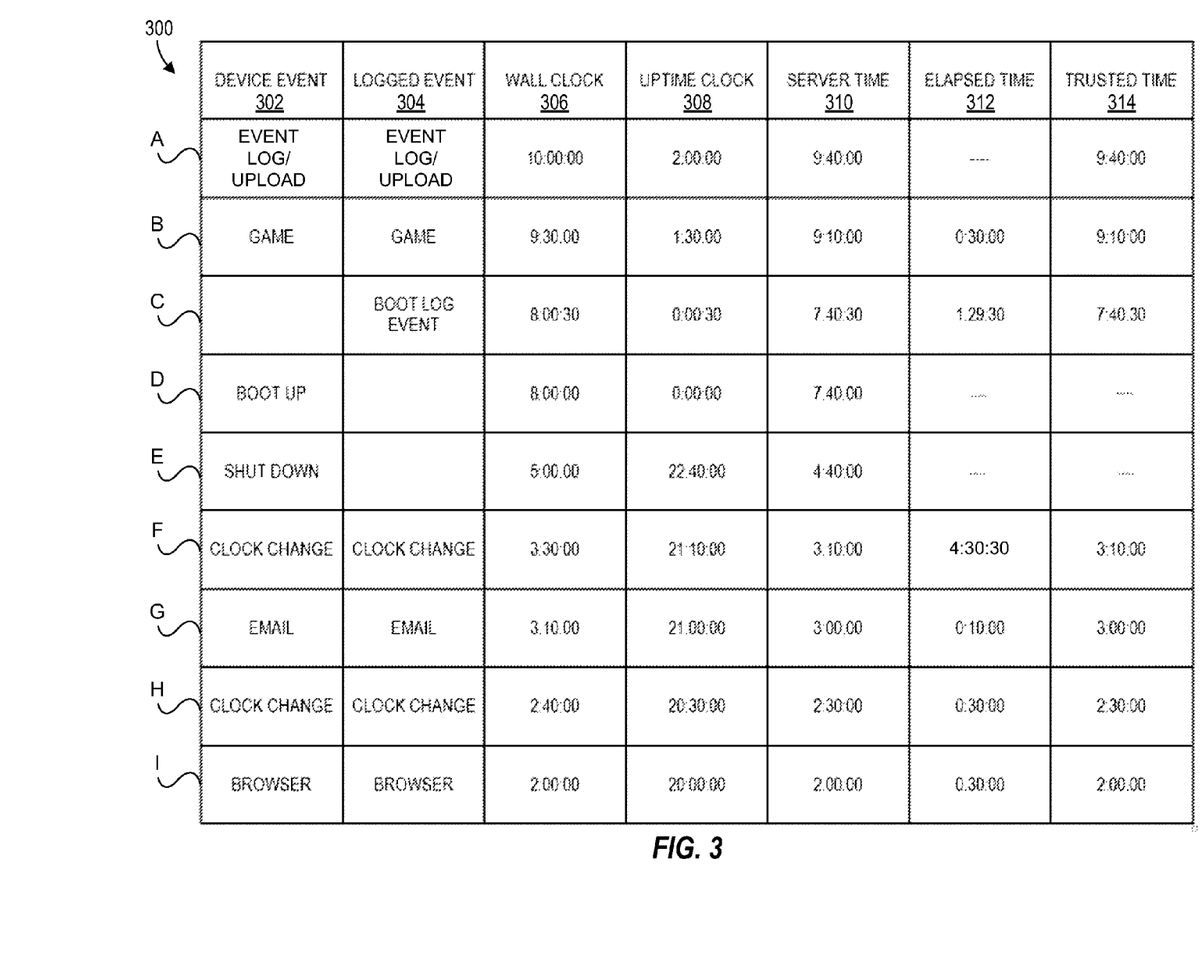
FIG. 3 illustrates a sample event log 300, according to an example implementation.

FIG. 3 illustrates a sample event log 300, according to some implementations. The sample event log 300 shown in FIG. 3 includes columns for: device event 302; logged event 304; wall clock timestamp 306 (e.g., as received from wall clock 160); uptime clock time 308 (e.g., as received from uptime clock 162); server time 310 (e.g., as received from processor clock 164); calculated elapsed time 312; and trusted time 314. Further, as shown in FIG. 3, each row is designated by a letter to be associated with each entry in the row. Thus, for example, the logged event "BOOT LOG EVENT" is designated as 302C. Further, in the sample event log 300, the clock change events at 304F and 304H represent a user setting their device's wall clock (e.g., wall clock 160) ahead ten minutes. As will be understood and appreciated, the event log 300 is provided merely for explanation and is not intended to be limiting. An event log may include more or less entries than are shown in event log 300. Further, as will be understood by one of skill in the art, when a computing device receives an event log, the event log does not include calculated elapsed time 312 or trusted time 314.

In the foregoing example, a computing device calculates the elapsed time 312 and calculates the trusted time 314 according to the method 200 shown in FIG. 2. Thus, after receiving 202 the event log 300, the computing device extracts 204 a current event 304A and the associated wall clock and uptime clock timestamps 306A, 308A. Upon determining the current event 304A is the first event in the event log 300, the computing device associates 208 the server time 310A with the current event 304A as the trusted time 314A.

Continuing with the foregoing example, the computing device extracts 204 another current event 304B and the associated wall clock and uptime clock timestamps 306B, 308B. The computing device determines 206 that the current event 304B is not an event log and determines the event preceding the current event 304B was not a boot log event. Accordingly, the computing device calculates 214 elapsed time based on the previous event uptime clock timestamp 308A and the current event uptime clock timestamp 308B. As shown in FIG. 3 at 312B, the computing device calculates the elapsed time 312B as 0:30:00. Subsequently, the computing device calculates 216 the current event trusted time by deducting the elapsed time 312B from the previous event trusted time 314A to arrive at a trusted time 314B of 9:10:00.

As will be understood and appreciated, in some implementations the method 300 continues traversing the event log 300. As shown in FIG. 3, in some implementations device events shut down 302E and boot up 302D are not logged as events at the device. As described earlier, the device can log boot log event 304C, which occurs some nominal time after boot up 302D. Continuing with the foregoing example but skipping ahead to event 304F, the computing device extracts 204 current event 304F and the associated wall clock and uptime clock timestamps 306F, 308F. The computing device determines 206 that the current event 304F is not an event log but determines 210 that the previous logged event 304C was a boot log event. Accordingly, the computing device calculates 212 elapsed time based on the previous event wall clock timestamp 306C and the current event wall clock timestamp 306F. As shown in FIG. 3 at 312F, the computing device calculates elapsed time 312F as 4:30:30. Continuing, the computing device calculates 216 the current event trusted time by deducting the elapsed time 312F from the previous event trusted time 314C to arrive at a trusted time 314F of 3:10:00.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions also may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. In a digital medium environment, a method implemented by a computing device for determining trusted times associated with one or more events of an event log, the method comprising:
    receiving, by the computing device, the event log;
    determining, by the computing device, whether an event of the event log has an immediately preceding event;
    responsive to a determination that the event does not have the immediately preceding event, associating, by the computing device, a system time of the computing device as a trusted time associated with the event; or
    responsive to a determination that the event has the immediately preceding event and that the immediately preceding event comprises a boot log event:

calculating, by the computing device, an elapsed time between the event and the immediately preceding event based on a wall clock time associated with the immediately preceding event and a wall clock time associated with the event; and calculating, by the computing device, the trusted time associated with the event by deducting the elapsed time from a trusted time associated with the immediately preceding event; or responsive to a determination that the event has the immediately preceding event and that the immediately preceding event does not comprise a boot log event:

calculating, by the computing device, the elapsed time between the event and the immediately preceding event based on an uptime clock time associated with the immediately preceding event and an uptime clock time associated with the event; and calculating, by the computing device, the trusted time associated with the event by deducting the elapsed time from the trusted time associated with the immediately preceding event; and outputting, by the computing device, the event and the trusted time associated with the event.

2. The method of claim 1, further comprising:
determining, by the computing device, a plurality of trusted times for a plurality of events of the event log based on respective wall clock times and uptime clock times associated with the plurality of events.

3. The method of claim 2, further comprising:
calculating, by the computing device, an elapsed time between two events of the plurality of events of the event log based on the determined trusted times for the two events; and
outputting, by the computing device, the elapsed time between the two events.

4. The method of claim 3, wherein the two events are associated with a beginning and an end of an out-of-the-box computer setup, respectively.

5. The method of claim 3, wherein the two events are associated with a request sent to a third-party server and a response received from the third-party server, respectively.

6. The method of claim 3, wherein the two events are associated with a navigation from a first functionality of an application to a second functionality of the application.

7. The method of claim 1, wherein the wall clock time is user changeable.

8. The method of claim 1, wherein the event log is received from a remote computing device, the wall clock time and the uptime clock time are of the remote computing device, and the system time is of the computing device.

9. A system comprising:
one or more processors;
a memory coupled to the one or more processors and storing instructions that, when executed by the one or more processors, cause the system to perform operations comprising:
receiving the event log;
determining whether an event of the event log has an immediately preceding event;
responsive to a determination that the event does not have the immediately preceding event, associating a system time of the system as a trusted time associated with the event; or
responsive to a determination that the event has the immediately preceding event and that the immediately preceding event comprises a boot log event:

calculating an elapsed time between the event and the immediately preceding event based on a wall clock time associated with the immediately preceding event and a wall clock time associated with the event; and calculating the trusted time associated with the event by deducting the elapsed time from a trusted time associated with the immediately preceding event; or responsive to a determination that the event has the immediately preceding event and that the immediately preceding event does not comprise a boot log event:

calculating the elapsed time between the event and the immediately preceding event based on an uptime clock time associated with the immediately preceding event and an uptime clock time associated with the event; and calculating the trusted time associated with the event by deducting the elapsed time from the trusted time associated with the immediately preceding event; and outputting the event and the trusted time associated with the event.

10. The system of claim 9, wherein the operations further comprise:
determining a plurality of trusted times for a plurality of events of the event log based on respective wall clock times and uptime clock times associated with the plurality of events.

11. The system of claim 10, wherein the operations further comprise:
calculating an elapsed time between two events of the plurality of events of the event log based on the determined trusted times for the two events; and
outputting the elapsed time between the two events.

12. The system of claim 11, wherein the two events are associated with a beginning and an end of an out-of-the-box computer setup, respectively.

13. The system of claim 11, wherein the two events are associated with a request sent to a third-party server and a response received from the third-party server, respectively.

14. The system of claim 12, wherein the two events are associated with a navigation from a first functionality of an application to a second functionality of the application.

15. The system of claim 12, wherein the wall clock time is user changeable.

16. The system of claim 12, wherein the event log is received from a remote computing device, the wall clock time and the uptime clock time are of the remote computing device, and the system time is of the system.

17. A non-transitory computer-readable medium storing instructions that, when executed by one or more processors, cause a computing device to perform operations comprising:
receiving the event log;
determining whether an event of the event log has an immediately preceding event;
responsive to a determination that the event does not have the immediately preceding event, associating a system time of the computing device as a trusted time associated with the event; or
responsive to a determination that the event has the immediately preceding event and that the immediately preceding event comprises a boot log event:
calculating an elapsed time between the event and the immediately preceding event based on a wall clock time associated with the immediately preceding event and a wall clock time associated with the event; and calculating the trusted time associated with the event by deducting the elapsed time from a trusted time associated with the immediately preceding event; or responsive to a determination that the event has the immediately preceding event and that the immediately preceding event does not comprise a boot log event:

calculating the elapsed time between the event and the immediately preceding event based on an uptime clock time associated with the immediately preceding event and an uptime clock time associated with the event; and calculating the trusted time associated with the event by deducting the elapsed time from the trusted time associated with the immediately preceding event; and outputting the event and the trusted time associated with the event.

18. The non-transitory computer-readable medium of claim 17, wherein the operations further comprise:
determining a plurality of trusted times for a plurality of events of the event log.

19. The non-transitory computer-readable medium of claim 17, wherein the operations further comprise:
calculating an elapsed time between two events of the plurality of events of the event log based on the determined trusted times for the two events; and
outputting the elapsed time between the two events.

20. The non-transitory computer-readable medium of claim 17,
wherein the uptime clock time is an elapsed time from a most recent boot log event.

21. The non-transitory computer-readable medium of claim 17,
wherein the event log is received from a remote computing device, the wall clock time and the uptime clock time are of the remote computing device, and the system time is of the computing device.

* * * * *